United States Patent [19]

Carter et al.

[11] Patent Number: 4,518,544

[45] Date of Patent: May 21, 1985

[54] SERPENTINE FILM FILL PACKING FOR EVAPORATIVE HEAT AND MASS EXCHANGE

[75] Inventors: Thomas P. Carter, Laurel; Edward N. Schinner, Highland; Richard H. Harrison, Jr., Columbia; Robert E. Cates, Arnold, all of Md.

[73] Assignee: Baltimore Aircoil Company, Inc., Jessup, Md.

[21] Appl. No.: 459,735

[22] Filed: Jan. 20, 1983

[51] Int. Cl.³ .............................................. B01F 3/04
[52] U.S. Cl. ........................... 261/112; 261/DIG. 11; 428/183
[58] Field of Search ................... 261/112, DIG. 11; 428/183; 165/166

[56] References Cited

U.S. PATENT DOCUMENTS

| | | | |
|---|---|---|---|
| 389,624 | 9/1888 | Wilson | 261/112 |
| 2,977,103 | 3/1961 | Smith et al. | 261/112 X |
| 3,084,918 | 4/1963 | Kohl et al. | 261/112 |
| 3,216,494 | 11/1965 | Goodman | 261/112 X |
| 3,249,155 | 5/1966 | Huet | 261/112 X |
| 3,262,682 | 7/1966 | Bredburg | 261/112 X |
| 3,374,992 | 3/1968 | Greer | 261/112 |
| 3,540,702 | 11/1970 | Uyama | 261/112 |
| 3,612,494 | 10/1971 | Toyama et al. | 261/112 |
| 3,618,778 | 11/1971 | Benton et al. | 261/112 X |
| 3,733,063 | 5/1973 | Loetel et al. | 261/112 |
| 4,361,426 | 11/1982 | Carter et al. | 428/183 X |

FOREIGN PATENT DOCUMENTS 450524 4/1935 United Kingdom ............... 428/183

Primary Examiner—Richard L. Chiesa
Attorney, Agent, or Firm—David L. Rose; Michael C. Sudol, Jr.; Mario A. Monaco

[57] ABSTRACT

A contact body or evaporative heat and mass exchanger packing composed of a plurality of side-by-side thin sheets interlocked with one another. The sheets are grooved with a serpentine-like, continuously-variable, cross section form to produce a plurality of liquid and gas channels between the sheets. The sheets have integrally-formed knobs and sockets specifically located to provide up-spaced alternate sheet support without utilizing adhesives of any type. The sheets are preferably composed of a thermoplastic material of any desired length, being continuously pressure-vacuum formed from long sheet rolls. The groove crests abut adjacent sheets apices at continuously-variable spacings of both greater and lesser dimension than the basic edge spacing of the serpentine grooves. The flat crests or apices of grooves are also infinitely variable in width dimension while maintaining a constant sidewall groove angle. The individual sheets are rotatably oriented to provide ideal bottom edge alternate sheet displacement for enhancing fluid flow.

15 Claims, 6 Drawing Figures

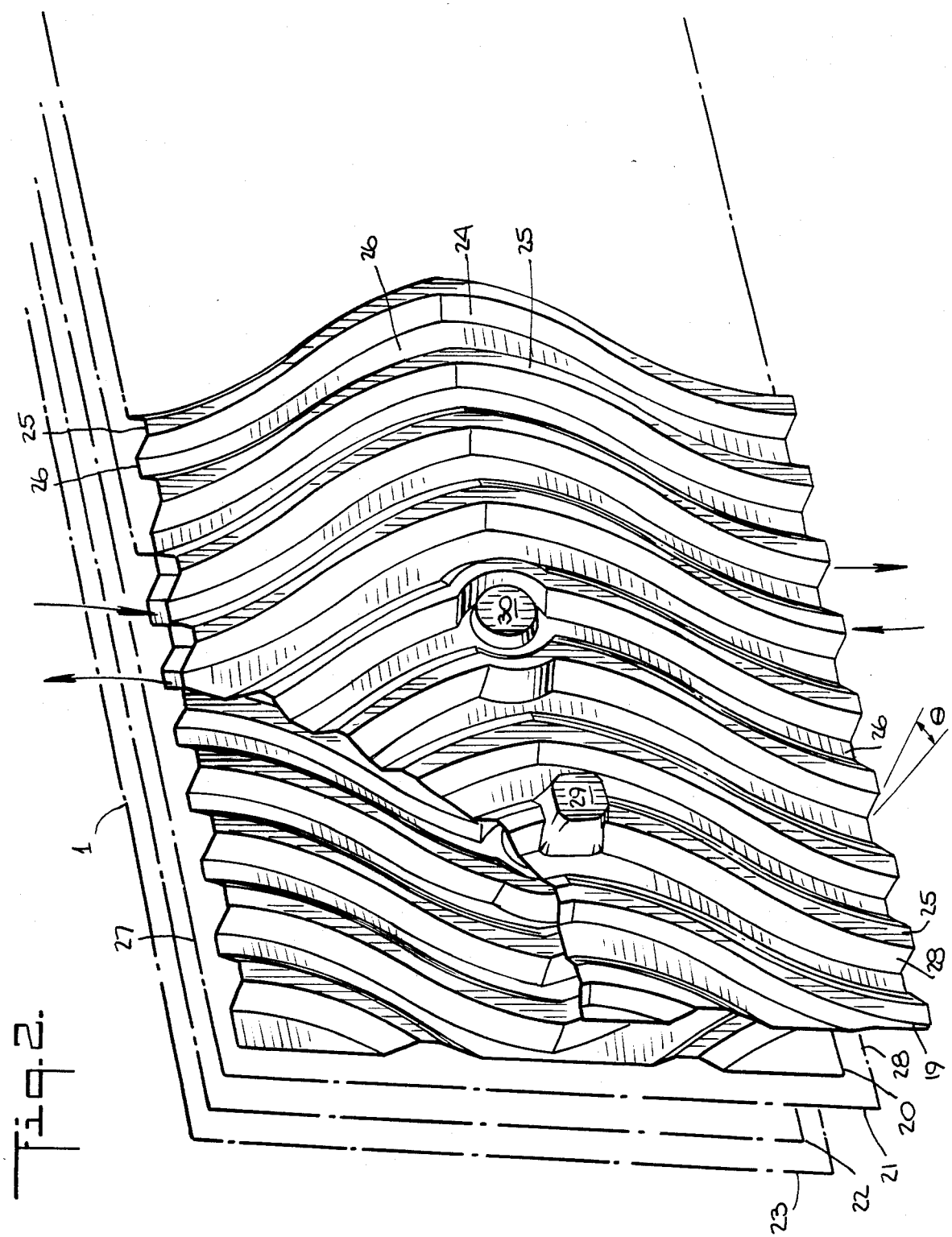

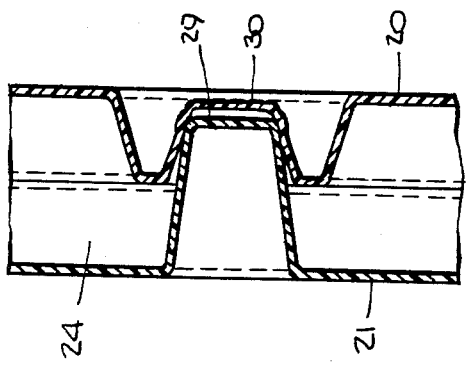
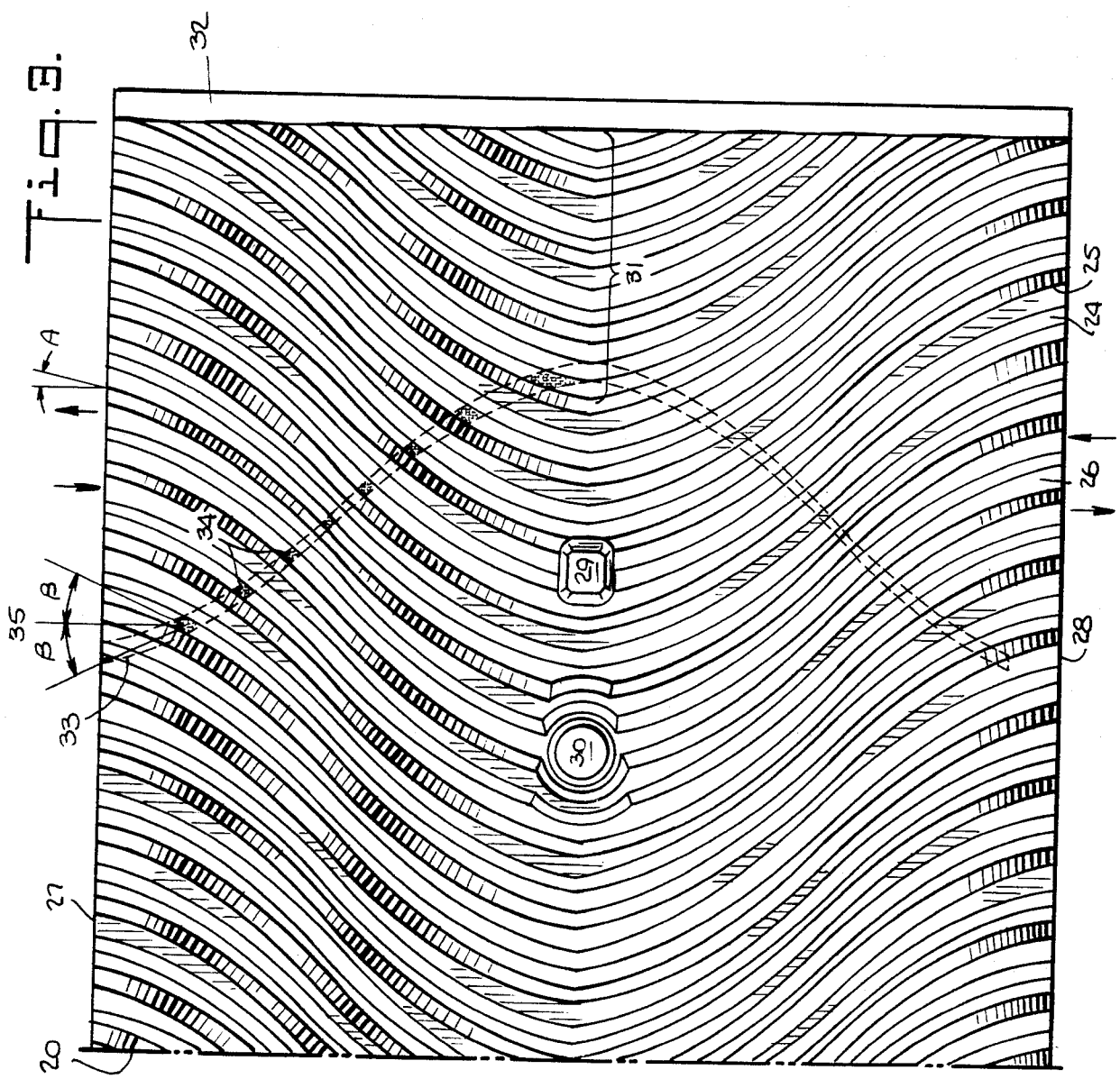

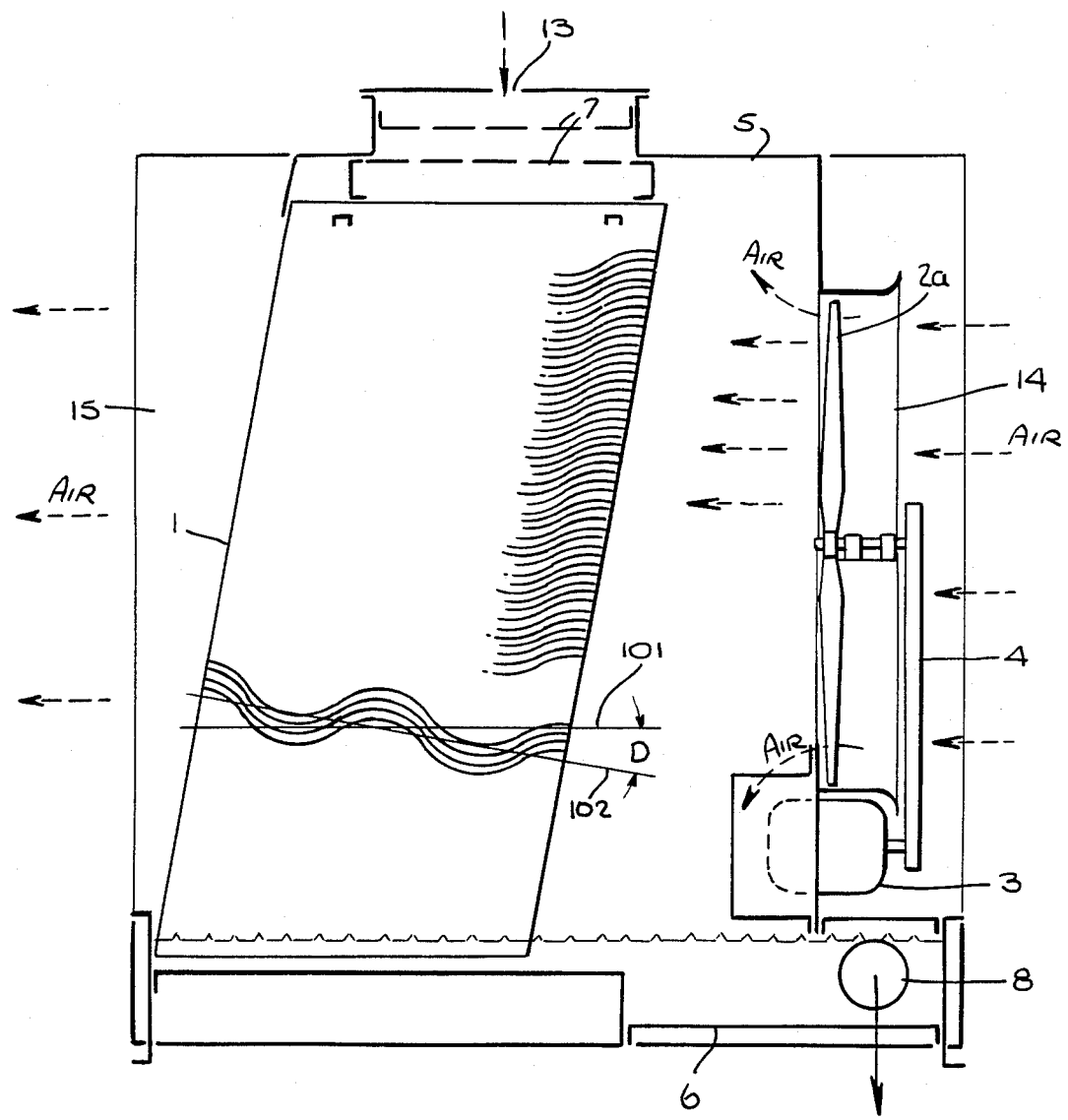

SERPENTINE FILM FILL PACKING FOR EVAPORATIVE HEAT AND MASS EXCHANGE

BACKGROUND OF THE DISCLOSURE

This invention relates to an evaporative liquid-to-gas heat and mass exchanger packing for the interaction of two fluids, such as air and water.

Specifically, this invention relates to a unique concept of components whose design features maximize tne rate of heat and mass transfer in which the liquid, which fully covers the sheet packing interfacial gas and liquid surface, to the gas or air which is drawn or forced through the spaced continuously-variable width passageway grooves between the individual sheets for the purpose of cooling or heating the liquid while heating and humidifying or cooling and dehumidifying the air or gas, respectively.

The most important field of application for the above-described component assembly is as an integral component of a water cooling tower, where important new features of highest thermal and mass transfer efficiency, low air friction, rigid self-supporting individual groove ribs and inherent spacing-support interlocks are most beneficial. The water cooling tower assembly and system provides other necessary components for the successful completion of the basic heat and mass transfer function of the above-described component, such as a fan for propelling air through the cooling tower filling, an electric motor and mechanical drive system for purpose of rotating the fan, a housing for enclosing the air and water of the fill packing and fan system, a lower pan or basin for collecting the cold water, a distribution pan or spray system for distributing the hot water to be cooled, a pump to return the cold water to the process stream to be reheated and piping to return the hot water to the cooling tower.

Specifically, the aforementioned unique fill packing is intended for counterflow, liquid to gas relationship, where hot liquid is directed downward across the fill packing and cool gas is directed upward in counter-current directional relationship. However, it is also conceivable that the fill packing can be used in a crossflow, liquid-to-gas relationship, having the serpentine grooves oriented generally horizontal with hot liquid directed downward and cool gas directed horizontally from one side of the fill packing to the other side. While counterflow is the preferred arrangement for maximizing the economic, thermal and energy benefits, crossflow may alternately be used logically to accommodate specific enclosures or available site spaces, particularly where the lowest overall height of the cooling tower is desirable.

The closest prior art of record of which we are aware and which may be used for comparison to illustrate the novelty of this new concept is shown in U.S. Pat. No. 3,262,682 to J. H. Bredburg. This prior art is distinguished by the consideration that all corrugations are cross-slanted on straight lines fully from edge to edge of the fill sheets, with passageways between sheets being of constant cross section, size and shape and with ridges and valleys being of constant width dimensions. Also this patent does not describe knob or socket-located supports to attain sheet interconnections.

Thus it is an object of this invention to provide a fill packing which has excellent heat and mass transfer characteristics. It is another object of this invention to provide a fill packing which has improved structural integrity. It is a further object of this invention to provide a fill packing with improved interlocking, non adhesive sheet attachment and support of adjacent elevated sheet structures.

An additional object of the invention is to provide a fill packing of the above described characteristics with minimum gas side-air friction pressure losses and more perfect liquid distribution and flow characteristics.

In order to better describe the invention herein there are enclosed six (6) figures.

FIG. 2 illustrates a perspective view of a portion of a typical fill packing of this invention.

FIG. 3 illustrates a profile view of a portion of a fill sheet.

FIG. 4 illustrates an end view of several fill sheets and FIG. 5 illustrates a cross sectional view of the interconnecting knob portion of typical fill sheets of our fill packing.

FIG. 6 illustrates a cross-sectional view of a typical evaporative heat and mass transfer apparatus which employs the subject fill packing with serpentine grooves oriented near horizontally for use in a cross flow water to air heat transfer relationship.

Figure 1:
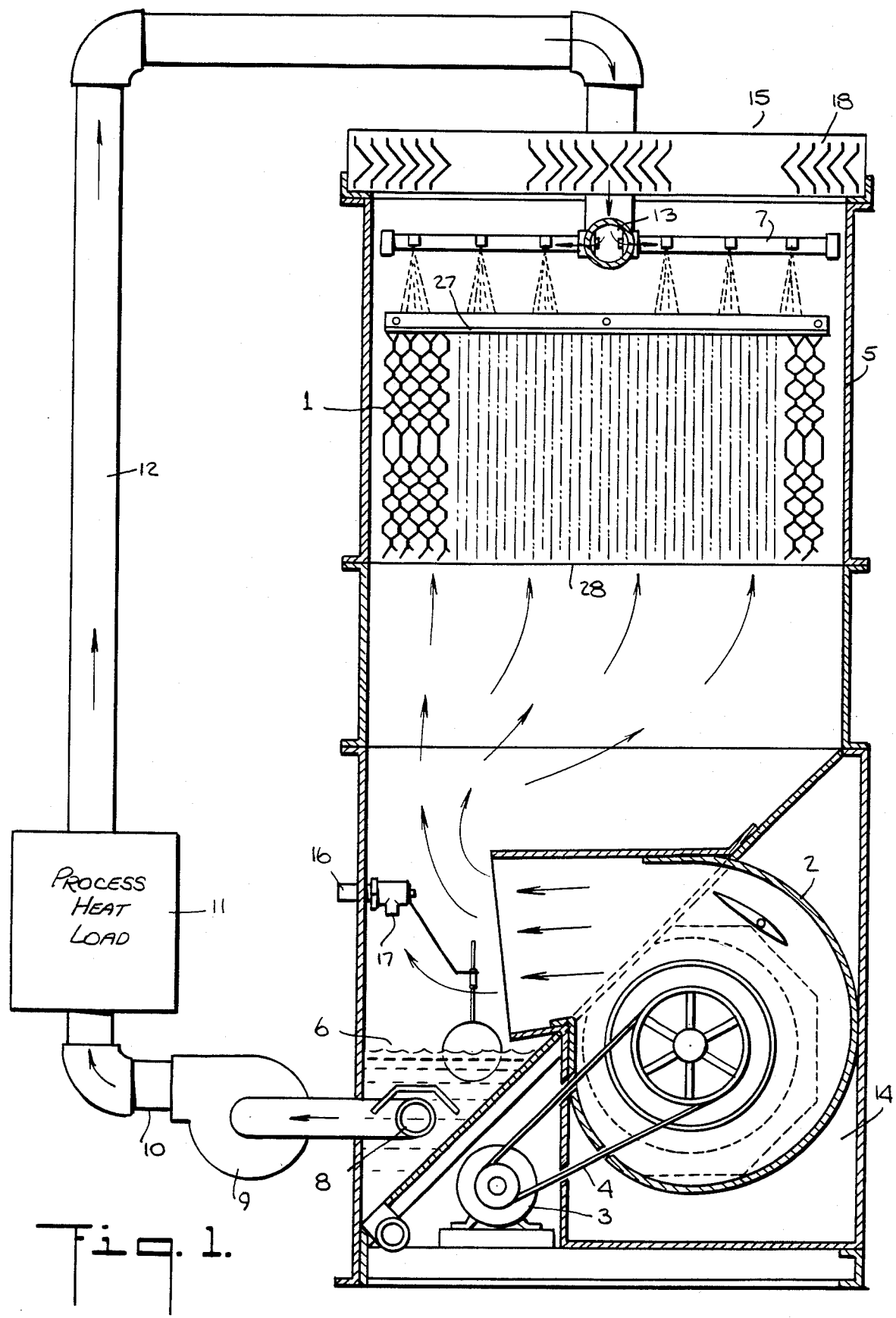
FIG. 1 shows a cross-section through a typical water cooling tower or evaporative heat and mass transfer apparatus which employs the subject fill packing.

In the diagrams, FIG. 1 which describes a typical water cooling tower or evaporative heat and mass transfer apparatus installation employs the subject fill packing 1, a centrifugal fan 2, an electric motor 3, a mechanical drive system 4, a casing or housing 5, a lower pan or cold liquid basin 6, a distribution flume or spray piping system 7, a cold liquid outlet 8, a recirculating pump 9, supply piping 10 which leads to the process heat load 11, return piping 12 which leads to the cooling tower hot liquid inlet 13, a cool gas entry space 14, a heated and humidified gas exhaust space 15, a make-up liquid inlet 16, and a float actuated valve 17 which replenishes evaporated liquid.

Thus warm liquid leaves the distribution flume or spray piping system 7 and flows over the fill packing 1 of our invention at which time, the liquid is cooled by sensible heat transfer and latent heat of vaporization on coming in contact with upwardly flowing gas (air) put in upward motion by the fan 2. The heated and humidified gas exits the water cooling tower through gas exhaust space 15 after passing through eliminator 18 wherein excess moisture is stripped from the gas. The cooled liquid falls into the lower pan 6 and is pumped to a process heat load 11 to be therein used and returned to the cooling tower in a continuous cycle.

Referring now to FIG. 2, there is shown a typical pack of the subject fill material 1 of our invention which consists of individual side-by-side sheets 19, 20, 21, 22 and 23 having serpentine or sinusoidal shapes 24, with crests or ridges 25, and valleys or grooves 26. Adjacent fill sheets such as sheets 19 and 20 in FIG. 2 have the serpentine or sinusoidal shapes 24 in directly opposite paths to each other as one moves down vertically from the top edge of the sheets 27 to the bottom edges 28. Furthermore, each bottom edge of alternate sheets 20 and 22 is up-spaced a distance from the immediate adjacent sheets for example sheets 20 and 22 are of slightly shorter height than adjacent sheets 19, 21 and 23. The alternate up-spaced sheets 20 and 22 are supported and maintained in place by spacing knob male locater 29 located on a ridge 25 of any sheet and spacing socket female locater 30 located within a valley 26 of any sheet. The groove side wall angle φ relative to a perpendicular to the plane of each sheet is of constant angle φ at any position in the fill groove sheet height. The groove width at a ridge or valley is constantly varying in dimension from the bottom to the top edge of the sheet. As can be seen in the orientation in FIG. 1, cool gas enters the fill pack 1 at 28, and exhausts as heated and humidified gas at 27. Hot liquid enters the fill pack 1 at 27 and leaves as cold liquid at 28.

FIG. 3 shows a portion of a typical fill sheet 20 which consists of a serpentine shape 24, consisting of a serpentine ridge 25, a knob male locator 29 on the ridge 25 and a socket female locator 30 within the valley 26. Again, hot liquid enters the fill at upper edge 27, cold liquid exits the fill at 28. There is an "end effect" region 31, where the air cannot follow a shape to exit at the top edge, but rather must follow either a path to the vertically flat end edge 32 or cross over ridges and valleys to exit at top edge. The hot liquid is cooled by cool gas entering at bottom 28 and exiting at 27. Still referring to FIG. 3, a typical ridge 33 of an adjacent sheet is shown as a dashed line to describe the angular relationship β between touch-points 34 of ridges or valleys of adjacent sheets. It should be noted that an isosceles angular relationship exists with reference to a vertical line 35, at each touch point 34 throughout the height of the sheet structure. Angle A defines the serpentine shape top edge entry angle relative to the vertical.

Figure 4:
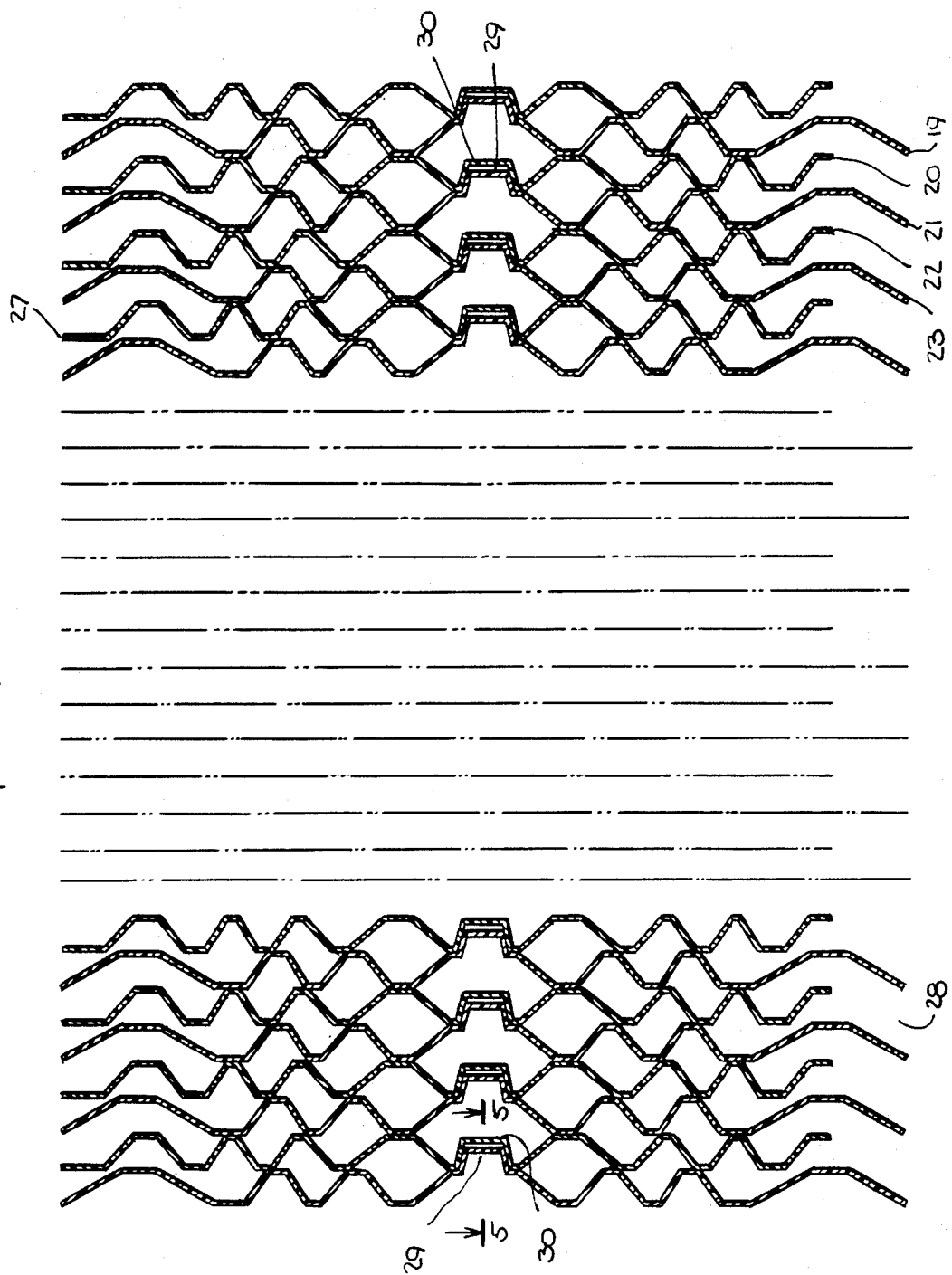

FIG. 4 which illustrates an end view of several fill sheets shows alternate upward positioned sheets 20 and 22 all interlocked with lower position fill sheets 19, 21 and 23, to produce a staggered bottom edge relationship. Gas exits at 27 and hot liquid enters at 27 whereas the cool entrance gas enters at 28 and now cooled liquid exits at bottom edge 28. Knob male locator 29 and socket female locator 30 are shown in their respective positions on one of the fill sheets.

FIG. 5 which is a cross-sectional view looking along line 5—5 of FIG. 4 through knob and socket locators of FIG. 4 shows fill sheets 20 and 21 with socket female locator 30 and knob male locator 29.

FIG. 6 illustrates a typical water cooling tower or evaporative heat and mass transfer apparatus installation which employs the subject fill packing, a propeller fan 2a, an electric motor 3, a mechanical drive system 4, a casing or housing 5, a lower pan or cold liquid basin 6, a distribution pan or spray piping system 7, a cold liquid outlet 8, a hot liquid inlet 13, a cool gas entry space 14, a heated and humidified gas exhaust space 15, the fill packing 1 is oriented with a horizontal line 101, a general direction of the serpentine line 102 and an angle of serpentine D. The straight line 102 which describes the general direction of the serpentine grooves is preferably oriented within approximately 7 to 12 degrees of the horizontal line 101 but may be oriented anywhere from 0–30 degrees from the horizontal.

The specific unique features which relate to the heretofore described invention are more specifically described below along with their functional advantages.

Referring to FIG. 3, the fill sheet is comprised of shapes 24, or pathways, for gas and liquid flow, which are continuously-variable, that is, changing in direction and cross section. The grooves constructed in this manner promote intimate and turbulent contact between the liquid and gas streams, thereby minimizing the formation of a detrimental boundary layer between the two streams.

The liquid entrance angle A of the serpentine fill shape 24 (liquid passageway) is near vertical to promote complete wetting of the top liquid entry face 27 of the fill, thereby eliminating shadowed areas of current slanted-edge designs which could not be wetted by vertical falling liquid from a distribution system or another fill deck above. The low (near vertical) bottom edge entrance angle for the entering gas 28 also reduces the fan system gas pressure drop increment which is required to move the gas into the fill pack from below.

The fill pack 1 of FIG. 1 is comprised of many self-spaced, generally vertically oriented sheets like those shown as 19, 20, 21, 22 and 23 (in FIG. 3) with serpentine shapes 24 with ridges 25 of the shapes touching adjacent sheet valleys 26. These adjacent sheets have intersecting gas and liquid streams which further promote gas mixing. The angularity B of the intersection between the two sheets changes as the fluids progress through the fill deck, due to the serpentine configuration of the pathways. The fill sheet is designed such that a fill deck assembly can be constructed by simply rotating every other sheet 180°, thus reducing the shipping volume of a stack of sheets to only approximately 5% of the volume of the assembled fill deck.

One aspect of this rotatable design is that the front side of one sheet faces the back side of an adjacent sheet. To maintain the same gas flow and thermal efficiency in these adjacent gas passageways, (one formed from the front side and one formed from the back side) the grooves 24 on the front side of the sheet were designed to be equal to the grooves on the back side of the sheet at each incremental adjacent position.

The serpentine shape of the basic groove 24 passageway pattern is also used to provide rigidity of the vertical sheet structure. The rigidity of an individual sheet is greatly enhanced by the serpentine configuration which causes a reversal in the direction of the groove, this occurring at least once in any desired sheet size usage. This, in combination with the continuously changing and variable groove path width, yields a fill sheet which, when supported on its edge, has extremely good vertical stiffness. The fill sheets are self-spacing in that the ridges 25 of one sheet touch the valleys 26 of the adjacent sheets. The great number of these lateral-supporting sheet contacts, (approximately 135 contacts per square foot of projected fill area) yield a fill deck assembly with extremely good vertical stiffness, when supported from the bottom edges.

For certain combinations of moderate to high liquid flow rates and moderate to high gas rates, it is preferable, from a gas pressure drop viewpoint, to separate the streams of liquid falling off the bottom edge 28 of each adjacent sheet. This can be done by making each alternate sheet 20 and 22 (in FIG. 2 FIG. 4) shorter in height and raising the bottom edge up to a higher position. This method is incorporated in the fill pack of this invention. The most common method of achieving this alternating bottom edge elevation is by glueing all the sheets together. Glueing is also used to compensate for inherent weakness in conventional, straight-grooved fills (non-serpentine) which could easily fold along one of the straight grooves or ridges and stretch or shrink (similar to an accordion) over the short length of fill groove. The fill of our invention with its greater vertical stiffness, does not need glue for structural rigidity; therefore, a better, non-glueing fill which utilizes knob and socket support locators was hereby unexpectedly found to provide the alternation of long and short sheets. In order to support the higher elevated alternate sheets, 20 and 22, the following approach is used: A male and female locator support knob 29 and 30 were designed integral with the serpentine groove to interlock together and thereby provide the support for the shorter height sheets 20 and 22 by transferring the short sheet support load through the knob, in shear, to the adjacent long sheets, 19, 21 and 23, which is then supported in bottom-edge bearing on the fill assembly support structure (not shown).

There are two male knob and two female socket locators in each minimum-size modular sheet. By rotating every other sheet, the male locators 29 of the first sheet align with the female locators 30 of the second sheet. The male locators 29 of the second sheet align with the female locators 30 of the third sheet, etc. In this manner, a short sheet is supported by the sheets on either side of it as described. Multiples of the minimum-size module sheets are used in single, continuous pieces up to 18 feet in sheet length.

In addition to supporting the shorter height sheets 20 and 22, the locators 29 and 30 are designed to provide a clutching or mechanical friction interfering relationship between adjacent sheets. The male knob locator 29 crest is generally square, or any non-circular form to provide an interference clutch-fit to the female socket locator 30 which is of a generally circular cone frustum shape, the walls of which are slightly outward-bowed during interlocked relationship. This arrangement has several advantages: being (1) greater fill deck rigidity, (2) remaining deck integrity if some sheets are damaged, destroyed, or loosely packed in the final assembly space and (3) ability to create pairs or small bundles of fill for easier handling, especially during field assembly of the product. Normal factory assembly employs a different method which doesn't specifically benefit from bundling techniques, but rather utilizes individual sheet handling beneficially in a more automated side-stacking manner.

Since the locators 29 and 30 are not a permanent part of the tooling (vacuum and pressure PVC forming mold) to produce the fill, but are removable to allow locators of slightly different dimension or design to be installed, different material thickness and/or degree of clutching can thereby be accommodated. The area around the female locator 30 is unique in that the grooves 26 on either side of the sheet have been made equal, such that gas and liquid can get around the locator on either side of the sheet, even though the physical diameter of the locator knob is actually larger than the groove in which it is located.

The width of the top of the male locator 29 was designed to be larger than the valley width. This feature prevents misalignment of the adjacent sheets during normal assembly methods, since there is only one location that the male locator 29 will seat, namely, the female location 30.

One aspect of any non-vertical grooved fill is that there will be some negative thermal performance end effects where the angled grooves 26 intersect an end wall or partition. In some commercially available fills in heights of 12" or 24", this end-affected region is approximately 6.9" and 13.8", respectively, whereas our serpentine design fill has only a constant of 4.7" end-affected region, no matter what the fill height module dimension of sheet width. In addition to minimizing the end-affected region, this fill has a transition to a flat section end (vertical edge of sheet) which keeps the liquid on the fill instead of dumping it onto the endwalls as do some of these other commercially available fills. Premature dumping of liquid from fill sheets to casing endwalls also produces an increment of thermal performance loss, since the liquid is not continued along the normal path within the fill pack where high cooling efficiency would be assured.

The fill sheets of our invention can be preferably constructed of any plastic material, such as for example polyvinylchloride (PVC), polycarbonate, and polypropylene. They are generally manufactured by a batch type model processer wherein the sheets of fill are vacuum formed while heated over a mold.

While several specific embodiments of the invention have been shown and described specific to cooling towers and water/air relationships for purpose of explanation and illustration, the invention is not to be limited thereby, and the true scope of usage in a variety of apparatus is determined by the broadest interpretation of the following claims.

What is claimed is:

1. Surface-type heat and mass exchanger fill packing assembly having a top, bottom and side edges for use in an evaporative heat and mass transfer apparatus for producing interaction between a liquid and a gas, said assemably being composed of continuously curved or serpentine-grooved, spaced vertically aligned sheets forming passageways having valleys and ridges formed by said grooves extending in a generally continuously curved, sinusoidal or serpentine path fr©m edge to edge of said sheets, the groove width at a ridge or valley constantly varying in width from edge to edge of the sheet along the groove, and the entrance angle for liquid at the one edge and gas at the opposite edge of the fill, being the angle of the groove relative to the perpendicular, is maintained nearest to said perpendicular, and where the groove side wall angle relative to the perpendicular to the plane of said fill is constant at any position on said fill, said passageways providing space and surface for liquid and gas interaction, the sheets having the ridges of adjacent sheet grooves forming variable-angle isosceles angular relationship with one another.

2. A fill packing assembly according to claim 1, wherein the edges of each alternate sheet are spaced away from the edges of the other sheets and held in position by interlocking knob and socket locators formed on the sheet area and wherein said knob locator has a noncircular knob crest and is nested within a socket locator with a generally circular cone frustum shape, outward-bowed during engagement, to provide clutch-fit interference when packed tightly together.

3. A fill packing assembly according to claim 1, wherein the grooves adjacent the interlocking knobs and socket locators are continuous from edge to edge of each sheet.

4. A fill packing assembly according to claim 1, wherein the adjacent sheets are 180° rotatably assembled.

5. A fill packing assembly according to claim 1, wherein the size of the end-effect region is influenced only by the groove half sheet-height or serpentine amplitude dimension.

6. A fill packing assembly according to claim 1, wherein the male locator knob crest is wider in dimension than the valley space between adjacent crest edges of all fill sheet grooves.

7. A fill packing assembly according to claim 1, wherein the side edges of serpentine fill sheets end in a vertical flat edging to maintain water transport on the fill sheet.

8. Surface-type heat and mass exchanger fill packing assembly having a top, bottom and side edges for use in an evaporative heat and mass transfer apparatus for producing interaction between a liquid and a gas, said assembly being composed of continuously curved or serpentine-grooved, spaced vertically aligned sheets, forming passageways having valleys and ridges formed by said grooves extending in a generally continuously curved, sinusoidal or serpentine path from top edge to bottom edge of said sheets, the groove width at a ridge or valley constantly varying in width from the bottom to the top of the sheet and the entrance angle for liquid at the top edge and gas at the bottom edge of the fill, being the angle of the groove relative to the vertical, is maintained nearest to vertical and where the groove sidewall angle relative to the perpendicular to the plane of said fill is constant at any position on said fill, said passageways providing space and surface for liquid and gas interaction, the sheets having the ridges of adjacent sheet grooves forming variable-angle isosceles angular relationship with one another.

9. A fill packing assembly according to claim 8, wherein the bottom edges of each alternate sheet are spaced away from the edges of the other sheets and held in position by interlocking knob and socket locators formed into the sheet area and wherein said knob locator has a non circular knob crest and is nested within a socket locator with a generally circular cone frustum shape, outward-bowed during engagement, to provide a clutch-fit interference when packed tightly together.

10. A fill packing assembly according to claim 8, wherein the grooves adjacent the interlocking knobs and socket locators are continuous from edge to edge of each sheet.

11. A fill packing assembly according to claim 8, wherein the adjacent sheets are 180° rotatably assembled.

12. A fill packing assembly according to claim 8, wherein the size of the end-effect region is influenced only by the groove half sheet-height or serpentine amplitude dimension.

13. A fill packing assembly according to claim 8, wherein the male locator knob crest is wider in dimension than the valley space between adjacent crest edges of all fill sheet grooves.

14. A fill packing assembly according to claim 8, wherein the side edges of serpentine fill sheets end in a vertical flat edging to maintain water transport on the fill sheet.

15. Surface-type heat and mass exchanger fill packing assembly having a top, bottom and side edges for use in an evaporative heat and mass transfer apparatus for producing interaction between a liquid and a gas, said assembly being composed of continuously curved, sinusoidal or serpentine-grooved, spaced vertically aligned sheets, forming passageways having valleys and ridges formed by said grooves extending in a generally continuously curved sinusoidal or serpentine path from edge to edge of said sheets, the groove width at a ridge or valley constantly varying in width from edge to edge of the sheet and the entrance angle for gas at the edge of the fill, being the angle of the groove relative to the perpendicular at said edge, is maintained nearest to said perpendicular, and where the groove sidewall angle relative to the perpendicular to the plane of said fill is constant at any position on said fill, said edge to edge orientation being either horizontal or within 30 degrees of the horizontal, said passageways providing space and surface for liquid and gas interaction, the sheets having the ridges of adjacent sheet grooves forming variable-angle isosceles angular relationship with each other.

* * * * *